(12) United States Patent
Lee et al.

(10) Patent No.: US 8,141,003 B1
(45) Date of Patent: Mar. 20, 2012

(54) MULTIPAGE NAVIGATION ON A SMALL SCREEN DEVICE

(75) Inventors: Woo Jae Lee, Manhattan, KS (US); Pujan Roka, Olathe, KS (US); Sanjay Sharma, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 409 days.

(21) Appl. No.: 12/424,307

(22) Filed: Apr. 15, 2009

(51) Int. Cl.
*G06F 3/00* (2006.01)

(52) U.S. Cl. ......... 715/864; 715/784; 715/238; 711/135

(58) Field of Classification Search .................. 715/784, 715/864, 238; 711/135
See application file for complete search history.

(56) References Cited

U.S. PATENT DOCUMENTS

| 7,188,312 | B2 * | 3/2007 | Hsiu-Ping et al. | 715/249 |
|---|---|---|---|---|
| 7,612,761 | B2 * | 11/2009 | Wong et al. | 345/156 |
| 2002/0126154 | A1 * | 9/2002 | Watson | 345/784 |
| 2003/0135649 | A1 * | 7/2003 | Buckley et al. | 709/247 |
| 2003/0146930 | A1 * | 8/2003 | Schelvis et al. | 345/738 |
| 2004/0100510 | A1 * | 5/2004 | Milic-Frayling et al. | 345/864 |
| 2005/0044494 | A1 * | 2/2005 | Barnes et al. | 715/531 |
| 2005/0071754 | A1 * | 3/2005 | Morgan et al. | 715/511 |
| 2007/0101061 | A1 * | 5/2007 | Baskaran et al. | 711/118 |
| 2007/0288841 | A1 * | 12/2007 | Rohrabaugh et al. | 715/513 |
| 2008/0301543 | A1 * | 12/2008 | Maes et al. | 715/234 |
| 2010/0114906 | A1 * | 5/2010 | Yuan et al. | 707/747 |

OTHER PUBLICATIONS

"View PDFs in Full Screen Mode," pp. 1-2, http://help.adobe.com/en_US/Acrobat/9.0/Standard/WS58a04a822e3e50102bd615109794195ff-7fa2.w.html.
Clark, S.E., "Infranview," 1999, pp. 1-4, http://gd.tuwien.ac.at/graphics/irfantut/viewmenu.html.
"View Full Screen," Mar. 21, 1998, p. 1, http://www.helpwithwindows.com/windows95/ie40-26.html.

* cited by examiner

*Primary Examiner* — Dennis Bonshock

(57) ABSTRACT

Systems, methods, and computer-readable media for improving user navigation of a multi-page article on a small screen user device. In embodiments, as a user progresses through the multi-page article, pages and/or lines of text of the multi-page article are cached. In response to a user request to view the multi-page article in a full-page format, the cached content is compared against text of the full-page document and used to determine a presentation of the text that displays nonduplicative content to the user.

19 Claims, 7 Drawing Sheets

MULTIPAGE NAVIGATION ON A SMALL SCREEN DEVICE

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention provide methods for, among other things, improving user navigation of a multi-page article on a small screen user device. The present invention may apply to a mobile communications device that has internet capability. A user may use the device to access web-based documents in a multi-page format. The device may possess the ability to cache pages and/or lines of text of the web-based document as a user progresses through the document. In response to a user request to view the web-based document in a full-page format, the cached content is compared against text of the full-page document and used to determine a presentation of the text that displays non-viewed content to the user.

Accordingly, in one aspect, a method is provided for improving user navigation of a multi-page article on a small screen user device. The method includes presenting one page of the multi-page article to a user on the screen of a user device. As the user progresses through the multi-page article, the pages presented are cached. When a request is received from the user to view the multi-page article as a full-page article, the cached one or more pages are compared to the full-page article to determine a first appearance of non-duplicative text in the full-page article. After the comparison has been made, the full-page article is presented to the user with the screen of the user device showing a page containing the first appearance of non-duplicative text in the full-page article.

In another aspect, another method is provided for improving user navigation of a multi-page document on a small screen user device. The method also comprises presenting one page of the multi-page document to a user on a screen of the user device. As the user progresses through the multi-page document, one or more lines of text are cached. In response to receiving a request from the user to view the multi-page document as a full-page document, the cached one or more text lines are compared to the full-page document to determine a first appearance of non-duplicative text in the full-page document. After the first appearance of non-duplicative text is determined, the full-page document is presented to the user. The page displayed on the screen of the user device is the first appearance of non-duplicative text of the full-page document.

In a further aspect, a method is provided for improving user navigation of a multi-page document on a small screen user device. The method comprises presenting one page of the multi-page document to a user on a screen of the user device. As the user progresses through the multi-page document, the most recently presented one or more text lines of the multi-page document are cached. After a request is received from the user to view the multi-page document as a full-page document, the cached most recently presented one or more text lines are compared to the full-page document to determine the location of the first stored text line in the full-page document. After the determination is made, the full-page document is presented to the user with the screen of the user device showing the first stored text line in the full-page document.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
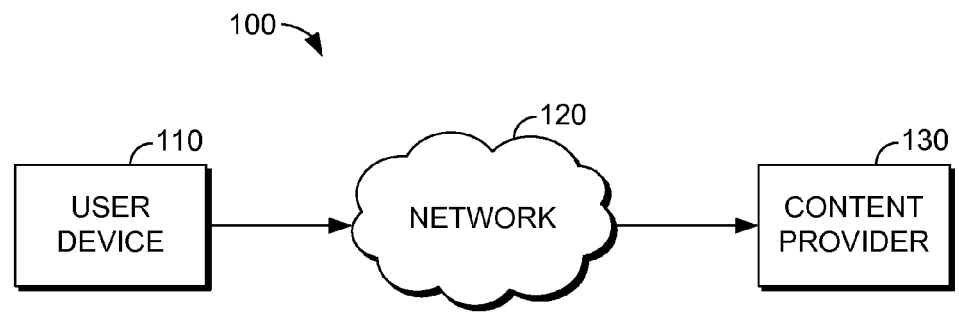
FIG. 1 illustrates an exemplary computing system for improving user navigation of a multi-page article on a small screen user device in accordance with an embodiment of the present invention.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| 3G | Third-Generation Wireless Technology |
| 4G | Fourth-Generation Cellular Communication System |
| CD | Compact Disk |
| CD-ROM | Compact Disk Read Only Memory |
| DSL | Digital Subscriber Line |
| DVD | Digital Versatile Discs |
| EEPROM | Electrically Erasable Programmable Read Only Memory |
| LAN | Local Area Network |
| MP3 | MPEG-1 Audio Layer 3 |
| PC | Personal Computer |
| PDA | Personal Digital Assistant |
| RAM | Random Access Memory |
| ROM | Read Only Memory |
| URL | Uniform Resource Locator |
| WAN | Wide Area Network |
| WAP | Wireless Access Protocol |
| WI-FI | Wireless Interface of Mobile Computing Devices |
| WIMAX | Worldwide Interoperability for Microwave Access |

Further, various technical terms are used throughout this description. An illustrative resource that fleshes out various aspects of these terms can be found in *Newton's Telecom Dictionary* by H. Newton, 24$^{th}$ Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a data store, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for improving user navigation of a multi-page article on a small screen user device. In embodiments, a multi-page article comprises a web-based document that includes content distributed over more than one page or screen. The web-based document also includes a link that allows the user to access a full-page version of the web-based document. The full-page version of the web-based document includes all content of the web-based document in one continuous format. The user device may possess the ability to cache pages and/or lines of text of the web-based document as a user progresses through the document. Alternatively, as the user progresses through the article, one or more pages and/or lines of text may be cached at a data store communicatively coupled to the user device. The user device may also have the ability to track pages and/or lines of text that have been viewed most recently. In response to a user request to view the web-based document in a full-page format, the cached content may be compared against text of the full-page document and used to determine a presentation of the text that displays non-viewed content to the user.

The presentation of the text of the full-page article may be based on the caching procedure of the present invention. For example, if a page is cached, the alternative presentation of the text may be based on a page-by-page basis (e.g., starting at line 1 of page 4 or starting at line 1 of page 5). In other words, if pages are cached, the method may lack the ability to display the middle of a pre-defined page as the beginning of the non-viewed content. The page-by-page basis of presentation may be appropriate when a link to a full-page view is available at the end of each page. In such an embodiment, the user would presumably finish reading the page of text that is cached before requesting to be presented with a full-page article starting at the beginning of the next page.

Alternatively, if a line or plurality of lines is cached, the alternative presentation of the text may be done on a line-by-line basis. For example, if a user decides to switch to a full-page view after reading 23 out of 50 lines on page 2 of a multi-page document, the full-page display may present non-viewed text starting at line 24 of page 2. In further embodiments, the presentation of text may be set to show non-viewed text or to show one or more leading lines appearing prior to non-viewed text.

Referring to the drawings generally, and initially to FIG. 1 in particular, an exemplary computing system 100 for improving user navigation of a multi-page article on a small screen user device is provided in accordance with an embodiment of the present invention. As shown in FIG. 1, an exemplary computing system 100 includes a user device 110, a network 120 and a content provider 130.

Although embodiments of the present invention discussed herein disclose the use of a small screen user device, the user device 110 can be any computing device that is capable of web accessibility. That is, a user device 110 might be any computing device that can request, receive, and present web-based content. As such, the user device 110 might take on a variety of forms, such as a personal computer (PC), a laptop computer, a mobile phone, a personal digital assistance (PDA), a server, a CD player, a MP3 player, a video player, a handheld communications device, a workstation, any combination of these devices, or any other device that is capable of web accessibility. In one embodiment, the user device 110 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker (s), memory, a buffer(s), and the like.

The network 120 may include one or more wide area networks (WANs), one or more local area networks (LANs), one or more public networks, such as the Internet, and/or one or more private networks. Network 120 might include an array of devices, which are not shown so as to not obscure more relevant aspects of the invention. In a wireless telecommunications network, components such as a base station, a communications tower, or even access points (as well as other components) can provide wireless connectivity in some embodiments. By way of example only, network 120 might include a wireless telecommunications network or, alternatively, network 120 may include the Internet. Although single components are illustrated for clarity, one skilled in the art will appreciate that network 120 can enable communication between any number of user devices and content providers. In embodiments, the user device 110 and the content provider 130 utilize wireless application protocol (WAP) to enable Internet access from a mobile phone.

One skilled in the art will recognize that any computing system 100 having a network suitable for communicating between hosting devices, such as communication between user device 110 and content provider 130 via network 120, may be utilized for implementing the present invention. Such a computing system 100 may, for example, utilize wireless technology or wired technology for network access. Wireless technology may include any wireless technology including, but not limited to 3G, 4G, WI-FI, WIMAX and the like. Wired technology includes, for example, wireline, DSL, and the like.

Figure 2:
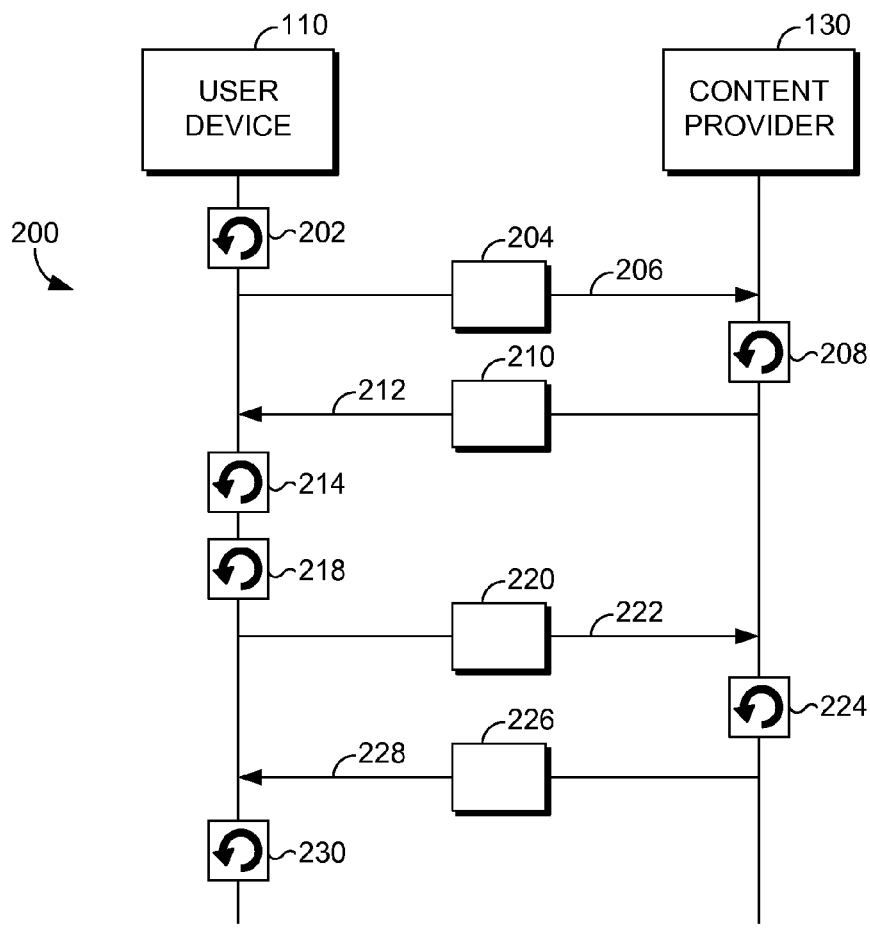
FIG. 2 discloses an exemplary flow diagram that illustrates a method for improving user navigation of a multi-page article on a small screen user device in accordance with an embodiment of the invention.

FIG. 2 discloses an exemplary flow diagram 200 that illustrates a method for improving user navigation of a multi-page article on a small screen user device in accordance with an embodiment of the invention. Initially, as shown at block 202, a user device 110 generates an article request 204. The article request 204 might contain, for example, a destination indicator in the form of a domain name within a URL (e.g., an initial URL). Generation of an article request 204 might be automatically initiated or initiated by a user. The article request 204 is communicated 206 to a content provider 130, where the content provider 130 may comprise a web service. In response to receiving the article request 204, at block 208 the content provider 130 may generate a response 210. The response 210 may include a requested multi-page article or a first page of a requested multi-page article. The response 210 is then communicated 212 to the user device 110. At block 214, the user device opens the response 210 and displays the multi-page article to the user. The multi-page article may be presented to the user on the small screen of the user device. The user may progress through the article, during which time the user device may cache pages and/or text lines that have already been viewed by the user or presented to the user. In alternative embodiments, page and/or text lines may be cached by a second device communicatively coupled to the user device 110. In these embodiments, the cached pages and/or text lines may be stored at a data store communicatively coupled to either the user device 110 or the secondary user device. The article can be read, page by page, using this method.

At some point during viewing of the multi-page article, the user may select a link requesting to view the article in a full-page format, such that all pages are delivered at one time. As such, at block 218 the user device 110 generates a full-page article request 220, where the full-page article request 220 may comprise at least some content cached during the user's progression through the article. The full-page article request 220 is communicated 222 to the content provider 130. At block 224, the content provider 130 compares the cached content contained in the full-page article request 220 to the full-page article. The content provider 130 may include an indicator, such as a tag, to signal to the user device 110 the location that comprises the first instance of non-duplicative text, wherein the first instance of non-duplicative text is an area in the full-page article subsequent to the matching text discerned from the aforementioned comparison between the cached text and the text of the full-page article. In alternative embodiments, the comparison of cached text to the text of the full-page article may occur at the user device 110 rather than at the content provider 130. In alternative embodiments, the full-page article request may be communicated to a server. At the server, the cached content contained in the full-page article request may be compared to the full-page article. At the server, an indicator, such as a tag, may be included to signal to the user device the location that comprises the first instance of non-duplicative text, wherein the first instance of non-duplicative text is an area in the full-page article subsequent to the matching text discerned from the aforementioned comparison between the cached text and the text of the full-page article. In further embodiments, the comparison of cached text to the text of the full-page article may occur at a second device communicatively coupled to the user device 110.

Still at block 224, the content provider 130 generates a full-page article response 226, where the full-page article response 226 may include the full-page article as well as the indicator containing a reference to the first instance of non-duplicative text. The full-page article response 226 is communicated 228 to the user device 110, where the user device opens 230 the response and displays the full-page article in an appropriate format to the user. The full-page article may be presented to the user one the small screen of the user device 110. Using the indicator, the article is presented to the user at the first location of non-duplicative text. This allows the user to request and view a full page article without having to relocate to the position within the document where the user left-off.

Figure 3:
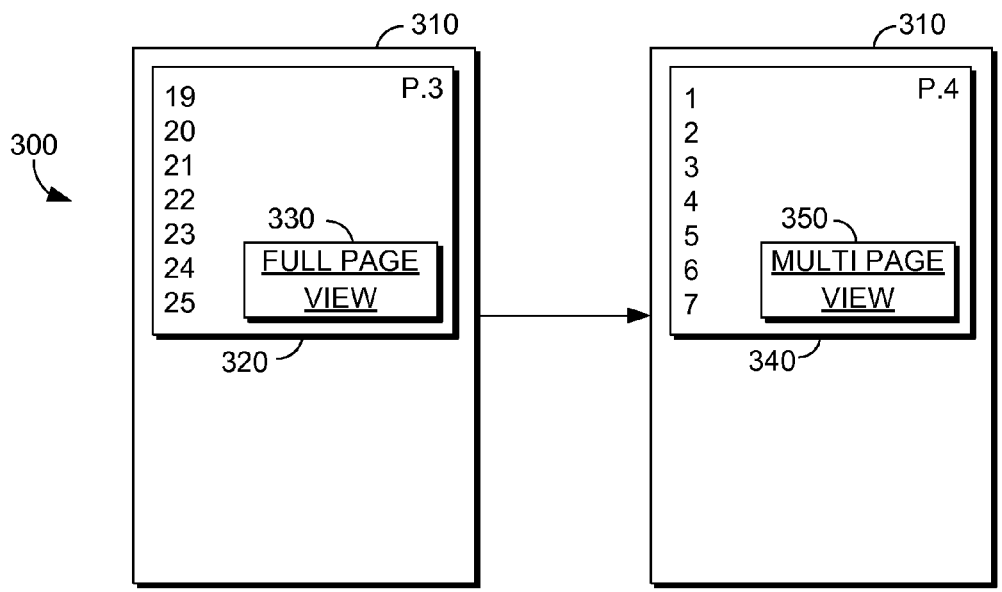
FIG. 3 illustrates a flow diagram showing a method for improving user navigation of a multi-page article on a small screen user device through the use of cached pages in accordance with an embodiment of the invention.

FIG. 3 illustrates a flow diagram 300 showing a method for improving user navigation of a multi-page article on a small screen user device through the use of cached pages in accordance with an embodiment of the invention. The diagram comprises two displays of a user device 310: a first presentation of a page 320 from a multi-page article, a link 330 to a full-page presentation of the article, a second presentation 340 of the full-page article, and a link 350 to a multi-page presentation of the article. In the embodiment shown, a first presentation of a page 320 shows the user has progressed to line 25 of page 3, wherein page 3 may comprise 25 lines. After a user selects a link 330 to a full-page presentation of the article, a second presentation 340 of the full-page article is shown on the user device 310. In the embodiment shown, the second presentation 340 of the full-page article begins at text analogous to line 1 of page 4 of the multi-page article.

In alternative embodiments, a user may choose to view a full-page presentation of the article before progressing to the end of a page of a multi-page article. For example, a user may select the link 330 to view the full-page presentation at line 12 of page 3, wherein link 330 may be available to the user throughout his progression through the multi-page article. In response to the selection, the full-page presentation 340 may begin at text analogous to line 1 of page 3 of the multi-page article. In embodiments, the full-page presentation 340 may begin at text analogous to line 1 of page 3 of the multi-page article or, alternatively, may begin at text analogous to line 1 of page 4 of the multi-page article, depending on the caching process used. For example, if a viewed page is not cached until the entire page has been viewed, then a full-page presentation like that described above may begin at text analogous to line 1 of page 3 of the corresponding multi-page article (since the last full page of the multi-page article fully viewed, and thus cached, would have been at page 2 of the multi-page article). However, if a viewed page is cached at the moment any part of the page is viewed, then a full-page presentation like that described above may begin at text analogous to line 1 of page 4 of the multi-page article (since the last page of the multi-page article accessed, and thus cached, would have been page 3 of the multi-page article). In further alternative embodiments, one or more pages may be cached as a user progresses through a full-page article. In these embodiments, in response to a user selecting the link 350 to a multi-page presentation of the article, the user may be presented with a page of the multi-page article corresponding to the most recently cached page the user has viewed in the full-page article.

Figure 4:
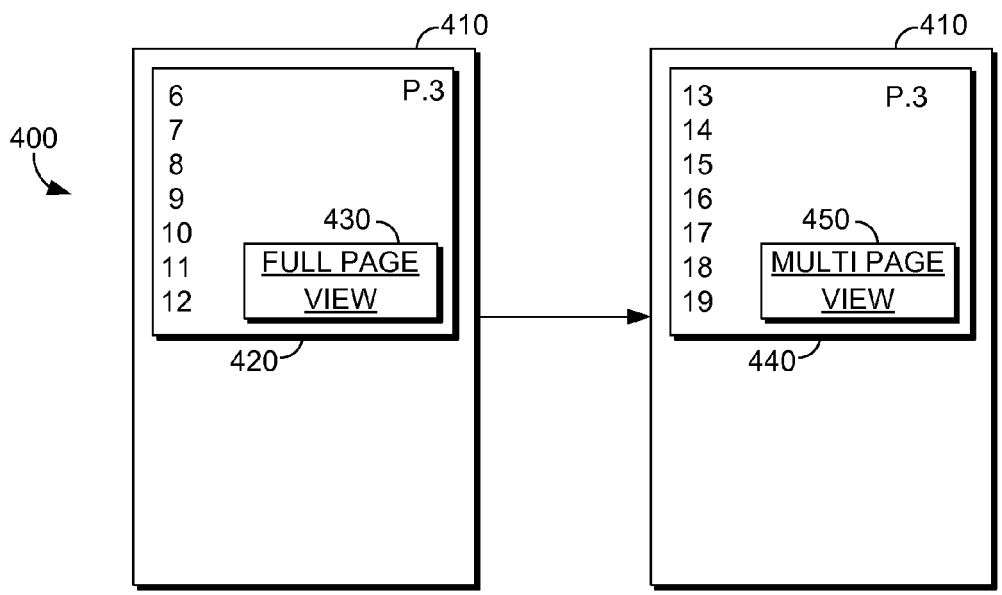
FIG. 4 illustrates a flow diagram showing a method for improving user navigation of a multi-page article on a small screen user device through the use of cached lines of text in accordance with an embodiment of the invention.

FIG. 4 illustrates a flow diagram 400 showing a method for improving user navigation of a multi-page article on a small screen user device through the use of cached lines of text in accordance with an embodiment of the invention. The diagram comprises two displays of a user device 410: a first presentation of a page 420 from a multi-page article, a link 430 to a full-page presentation of the article, a second presentation 440 of the full-page article, and a link 450 to a multi-page presentation of the article. In the embodiment shown, a first presentation of a page 420 shows the user has progressed to line 12 of page 3, wherein page 3 may comprise 25 lines. After a user selects a link 430 to a full-page presentation of the article, a second presentation 440 of the full-page article is shown on the user device 410. In the embodiment shown, the second presentation of a page of the full-page article begins at text analogous to line 13 of page 3 of the multi-page article. By caching lines of text versus pages of text, a user is able to be presented with a full-page-article that displays the first line of non-duplicative text, even when the user selects the link to the full-page article after progressing only midway through the reading of a page from the multi-page article.

In an embodiment similar to the example above, a user may have progressed to line 12 of page 3 of a multi-page article before requesting to view the full-page article. However, instead of being presented with text analogous to line 13 of page 3 of the multi-page article, the user may be presented with text analogous to line 10 of page 3 of the multi-page article. The content analogous to lines 10-12 of the multi-page article may be regarded as "leading lines." Leading lines may be useful to give a user context and/or orientation when he begins to read the article in the new format. In alternative embodiments, one or more lines of text may be cached as a user progresses through a full-page article. In these embodiments, in response to a user selecting a link 450 to a multi-page presentation of the article, the user may be presented with one or more lines of text of the multi-page article corresponding to the most recently cached one or more lines of text the user has viewed in the full-page article.

Figure 5:
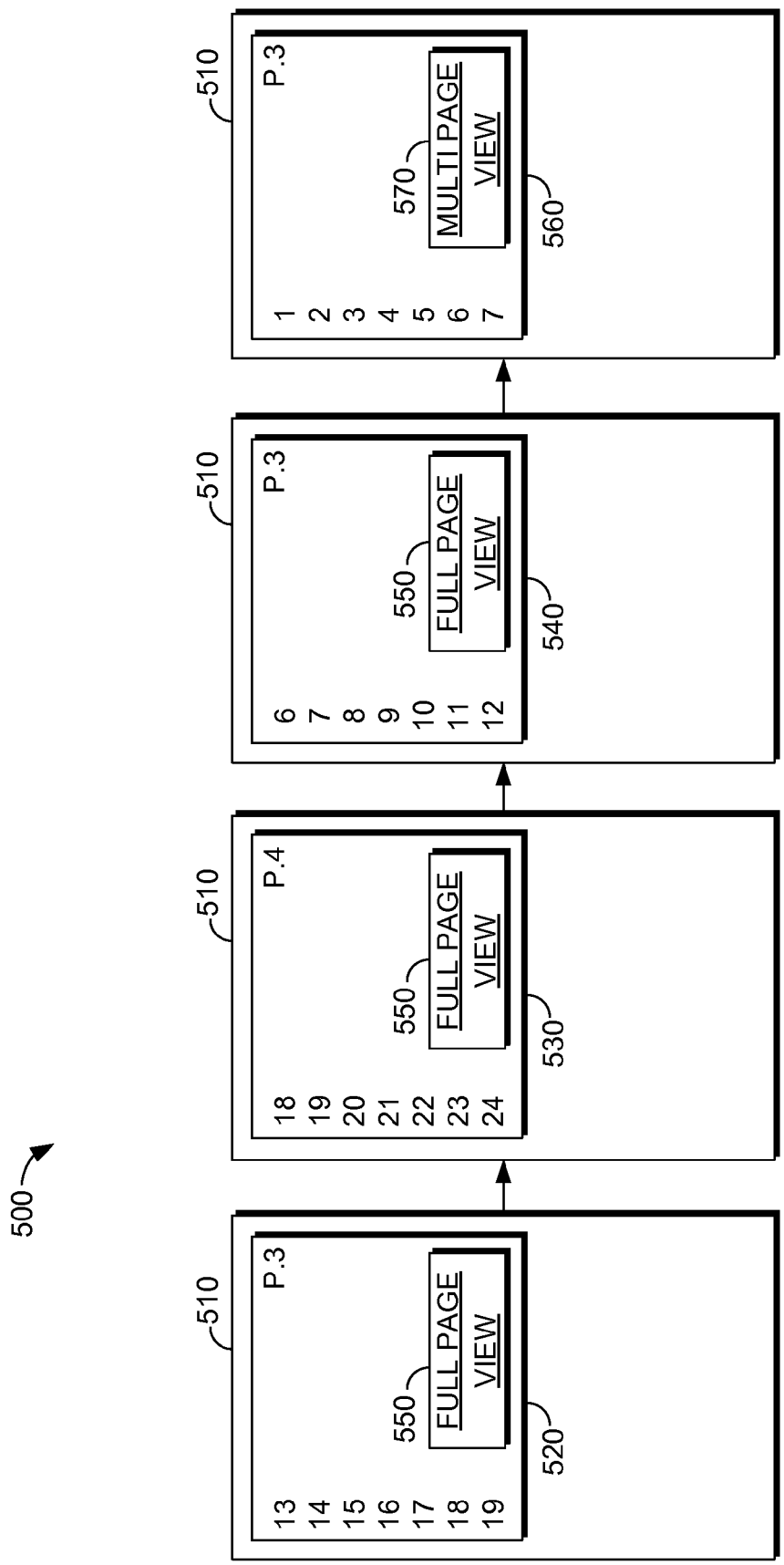
FIG. 5 illustrates a flow diagram showing a further method for improving user navigation of a multi-page article on a small screen user device through the use of most recently viewed cached pages in accordance with an embodiment of the invention.

FIG. 5 illustrates a flow diagram 500 showing a further method for improving user navigation of a multi-page article on a small screen user device through the use of most recently cached pages in accordance with an embodiment of the invention. The diagram comprises four displays of a user device 510: a first presentation of a page 520 from a multi-page article, a second presentation of a page 530 from a multi-page article, a third presentation of a page 540 from a multi-page article, a link 550 to a full-page presentation of the article, a fourth presentation 560 of the full-page article, and a link 570 to a multi-page presentation of the article. In the embodiments shown, a first presentation of a page 520 shows the user has progressed to line 19 of page 3, wherein page 3 may comprise 25 lines. A second presentation of a page 530 shows the user has further progressed to line 24 of page 4, wherein page 4 may comprise 25 lines. A third presentation of a page 540 shows the user has further progressed to line 12 of page 3, wherein page 3 may comprise 25 lines. After a user selects a link 550 to a full-page presentation of the article, a fourth presentation 560 of the full-page article is shown on the user device 510. In the embodiment shown, the fourth presentation 560 of the full-page article begins at text analogous to line 1 of page 3 of the multi-page article. In the embodiment shown, the user toggles between page 3 and page 4 before selecting to view the full-page article. As such, the most recently cached page is page 2 (since the user has only progressed mid-way through page 3), even though the user had viewed lines progressing to line 24 of page 4 prior to toggling back to line 12 of page 3.

In alternative embodiments, a page may be cached when any text is displayed. In these embodiments, the most recently cached page would be page 3 (since the user has progressed to at least one line of page 3) and thus, under this embodiment, the fourth presentation 560 of the full-page article may begin at text analogous to line 1 of page 4 of the multi-page article. In further alternative embodiments, one or more pages may be cached as a user progresses through a full-page article. In these embodiments, in response to a user selecting a link 570 to a multi-page presentation of the article, the user may be presented with a page of the multi-page article corresponding to the most recently cached page the user has viewed in the full-page article.

Figure 6:
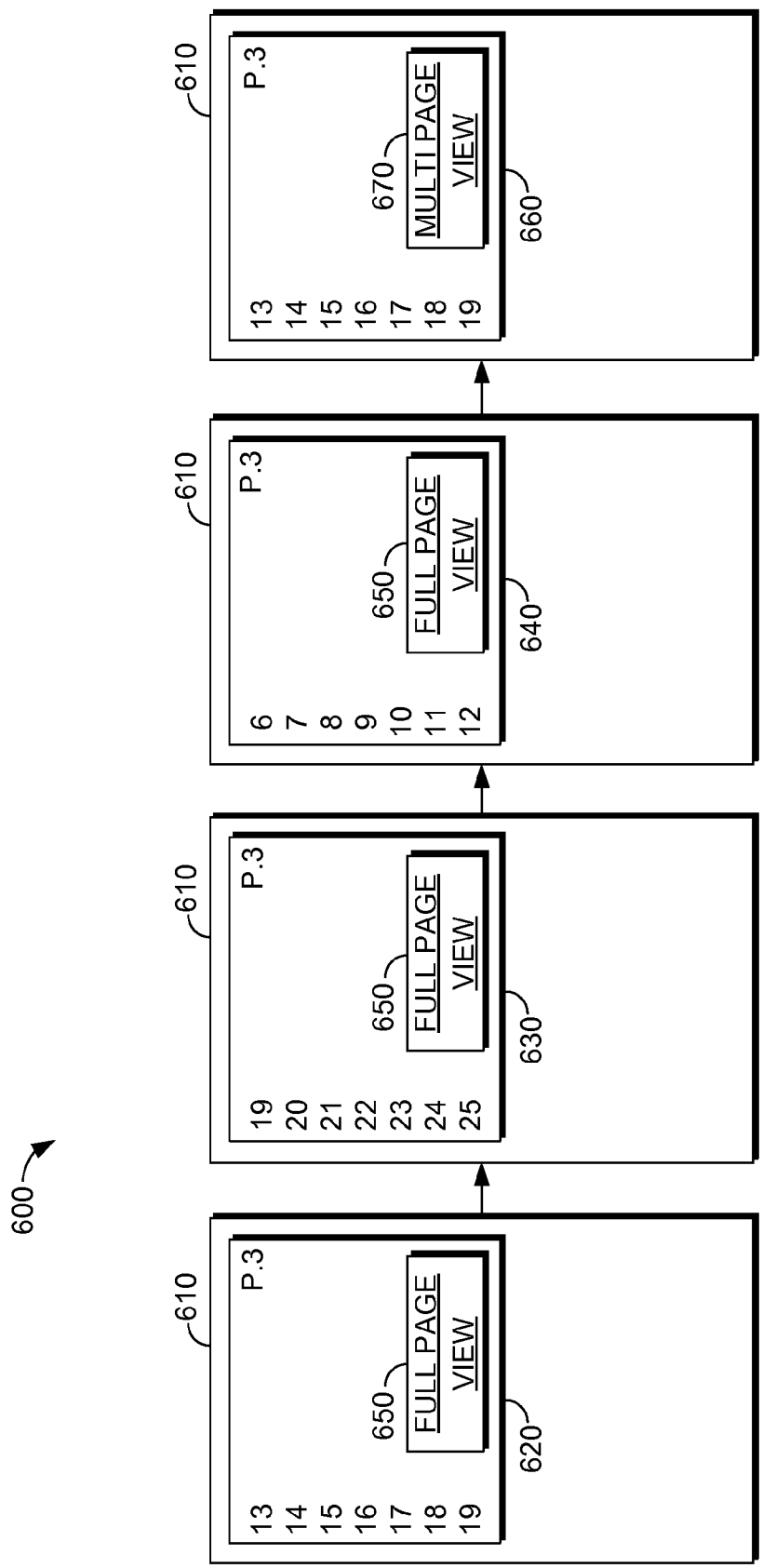
FIG. 6 illustrates a flow diagram showing a further method for improving user navigation of a multi-page article on a small screen user device through the use of cached lines of text in accordance with an embodiment of the invention.

FIG. 6 illustrates a flow diagram 600 showing a further method for improving user navigation of a multi-page article on a small screen user device through the use of most recently cached lines of text in accordance with an embodiment of the invention. The diagram comprises four displays of a user device 610: a first presentation of a page 620 from a multi-page article, a second presentation of a page 630 from a multi-page article, a third presentation of a page 640 from a multi-page article, a link 650 to a full-page presentation of the article, a fourth presentation 660 of the full-page article, and a link 670 to a multi-page presentation of the article. In the embodiments shown, a first presentation of a page 620 shows the user has progressed to line 19 of page 3, wherein page 3 may comprise 25 lines. A second presentation of a page 630 shows the user has further progressed to line 25 of page 3. A third presentation of a page 640 shows the user has regressed to line 12 of page 3. After a user selects a link 650 to display a full-page presentation of the article, a fourth presentation 660 of the full-page article is shown on the small screen of the user device 610. In the embodiment shown, the fourth presentation 660 of the full-page article begins at line 13 of page 3. In the embodiment shown, the user toggles between lines on page 3 before selecting to view the full-page article. As such, the most recently cached text line is line 12, even though the user had viewed through line 25 of page 3 prior to toggling back to line 12.

As described above, in embodiments, the use of cached text lines may allow a user to preferentially insert one or more lines of leading text prior to the presentation of non-duplicative text. In alternative embodiments, one or more lines of text may be cached as a user progresses through a full-page article. In these embodiments, in response to a user selecting a link 670 to a multi-page presentation of the article, the user may be presented with one or more lines of text of the multi-page article corresponding to the most recently cached one or more lines of text the user has viewed in the full-page article.

Figure 7:
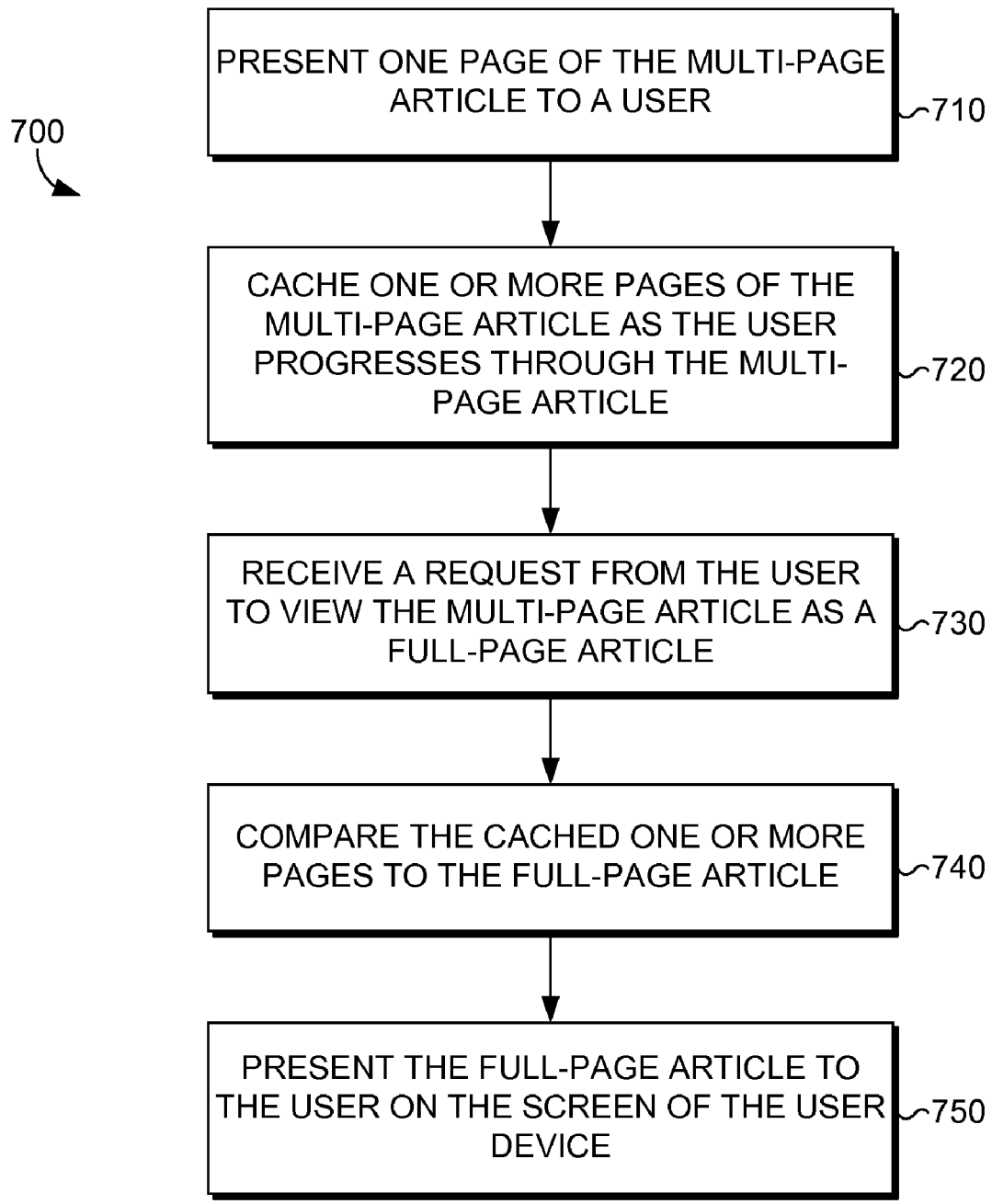
FIG. 7 provides a method for improving user navigation of a multi-page article on a small screen user device in accordance with an embodiment of the invention.

FIG. 7 illustrates a flow diagram 700 of a method for improving user navigation of a multi-page article on a small screen user device in accordance with an embodiment of the invention. Initially, as indicated at 710, one page of the multi-page article is presented to a user. The page is presented on the small screen of the user device. Next, at block 720, one or more pages of the multi-page article are cached as the user progresses through the multi-page article. In alternative embodiments, the pages that are most recently viewed are cached. In such embodiments, cached pages that are subsequent to a most recently viewed page are erased, eliminated, or otherwise distinguished as being a lesser priority than the most recently viewed page or pages. At block 730, a request is received from the user to view the multi-page article as a full-page article. In alternative embodiments, a user may initiate the request through a link within the text of the article. The link may be at a stationary position within the article, such as at the bottom of the article, or the link may be presented to the user continuously as the user progresses through the article.

At block 740, in response to the receipt of the request to view the multi-page article as a full-page article, the cached one or more pages are compared to the full-page article to determine a first appearance of non-duplicative text in the full-page article. Non-duplicative text may comprise text which has not been viewed by the user. It may also or alternatively comprise text which the user may have passed over too quickly, e.g., for less than a threshold amount of time. For example, a user may progress through parts of an article quickly so as to reach a link to a full-page presentation of the article at the bottom of the content. Finally, at step 750, a full-page article may be presented to the user. The screen of the user device may display a page containing the first appearance of non-duplicative text in the full-page article.

Figure 8:
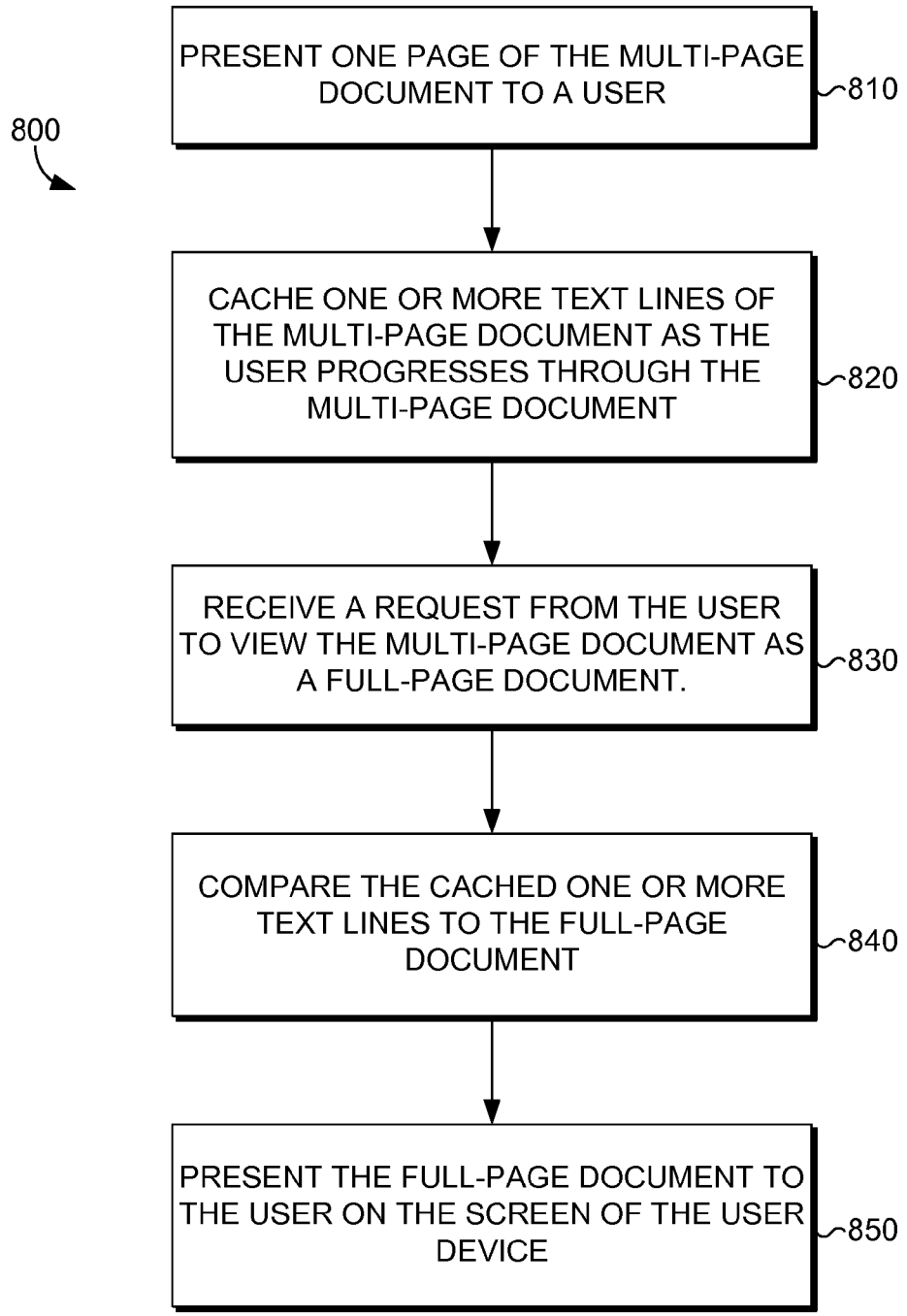
FIG. 8 provides a method for improving user navigation of a multi-page document on a small screen user device in accordance with an embodiment of the invention.

FIG. 8 illustrates a flow diagram 800 of a method for improving user navigation of a multi-page document on a small screen user device in accordance with an embodiment of the invention. Initially, as illustrated at block 810, one page of the multi-page document is presented to a user. The page is presented on the screen of the user device. Next, at block 820, one or more text lines of the multi-page article are cached as the user progresses through the multi-page document. In alternative embodiments, the pages that are most recently viewed are cached, such as in a manner described above. For example, one or more cached text lines subsequent to a most recently viewed page are erased, eliminated, or otherwise distinguished as being a lesser priority than the most recently viewed one or more text lines. At block 830, a request is received from the user to view the multi-page document as a full-page document. As described above, a user may initiate the request through a link within the text of the document or through a link presented to the user throughout the user's progression of the document.

At block 840, in response to the receipt of the request to view the multi-page document as a full-page document, the cached one or more text lines are compared to the full-page document to determine a first appearance of non-duplicative text in the full-page document. Finally, at step 850, a full-page document may be presented to the user. The screen of the user device may display a page containing the first appearance of non-duplicative text in the full-page document. For example, if the screen of the user displayed lines 3-12 of page 3 prior to the request to view the full-page document, the presentation of the full-page document may begin at text associated with line 13 of page 3 of the multi-page document. In alternative embodiments, the first appearance of non-duplicative text may be preceded by one or more cached text lines of most recently viewed text. This may allow the user to get oriented to the new format of the document and to the user's place in the document. For example, if the screen of the user displayed lines 3-12 of page 3 prior to the request to view the full-page document, the presentation of the full-page document may begin at line 10 of page 3 (e.g., three lines prior to the first instance of non-duplicative text). Alternatively, the display of the full-page document may be the same as the display viewed by the user. For example, if the screen of the user displayed lines 3-12 of page 3 prior to the request to view the full-page document, the presentation of the full-page document may begin at text associated with line 3 of page 3 of the multi-page document.

Figure 9:
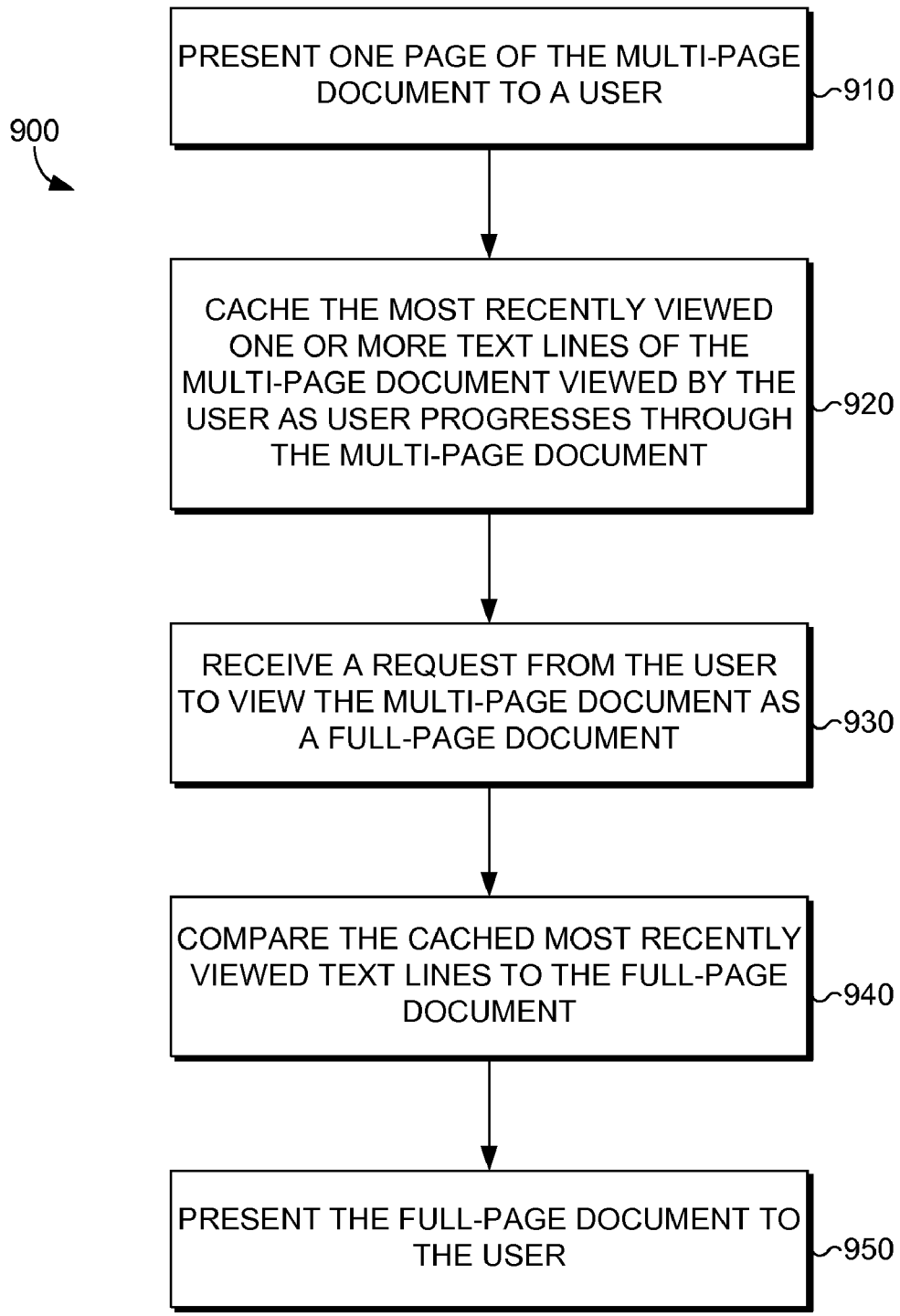
FIG. 9 provides another method for improving user navigation of a multi-page document on a small screen user device in accordance with an embodiment of the invention.

FIG. 9 illustrates a flow diagram 900 of a method for improving user navigation of a multi-page document on a small screen user device in accordance with an embodiment of the invention. Initially, as illustrated at block 910, one page of the multi-page document is presented to a user. The page is presented on the screen of a user device. Next, at block 920, the most recently viewed one or more text lines of the multi-page document are cached as the user progresses through the multi-page document. As described above, in the process of caching the most recently viewed one or more text lines, one or more cached text lines that are subsequent to one or more most recently viewed text lines may be erased, eliminated, or otherwise distinguished as being a lesser priority than the most recently viewed one or more text lines. At block 930, a request is received from the user to view the multi-page document as a full-page document. As described above, a user may initiate the request through a link within the text of the document or through a link presented to the user throughout the user's progression through the document.

At block 940, in response to the receipt of the request to view the multi-page document as a full-page document, the cached one or more most recently viewed text lines are compared to the full-page document to determine a first appearance of non-duplicative text in the full-page document. Finally, at step 950, a full-page document may be presented to the user. The screen of the user device may display a page containing the first stored text line in the full-page document. In alternative embodiments, the first appearance of non-duplicative text may be preceded by one or more cached text lines directly before the first stored text line. This may allow the user to get oriented to the new format of the document, and for the user to become reacquainted with the ideas associated with the user's place in the document. For example, if the screen of the user displayed lines 3-12 of page 3 prior to the request to view the full-page document, the presentation of the full-page document may begin at text associated with line 10 of page 3 of the multi-page article (e.g., three lines prior to the next instance of non-duplicative text). Alternatively, the display of the full-page document may be the same as the display viewed by the user. For example, if the screen of the user displayed lines 3-12 of page 3 prior to the request to view the full-page document, the presentation of the full-page document may begin at text associated with line 3 of page 3 of the multi-page document.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for improving user navigation of a multi-page article on a small screen user device, the method comprising:
presenting one page of the multi-page article to a user on a screen of the small screen user device;
caching one or more pages of the multi-page article as the user progresses through the multi-page article;
deleting cached data associated with one or more successive pages when the user goes back to an earlier page of the multi-page article;
receiving a request from the user to view the multi-page article as a full-page article;

comparing text of the cached one or more pages to text of the full-page article to determine a first appearance of non-duplicative text in the full-page article;

returning all pages of the full-page article together; and presenting the full-page article to the user with the screen of the small screen user device showing a page containing the first appearance of non-duplicative text in the full-page article.

2. The method of claim 1, wherein the cached one or more pages are stored on a server.

3. The method of claim 1, further comprising:

storing the cached one or more pages on the small screen user device;

generating a request, the request comprising the one or more cached pages;

sending the request to a server;

generating a response, the response comprising a tag to identify the first appearance of non-duplicative text; and sending the response to the small screen user device.

4. The method of claim 1, wherein the screen displays a portion of the one page of the multi-page article.

5. The method of claim 4, wherein the screen displaying the one page of the full-page article presented comprises the first line of the page containing the first appearance of non-duplicative text.

6. A method for improving user navigation of a multi-page document on a small screen user device, the method comprising:

presenting one page of the multi-page document to a user on a screen of the small screen user device;

caching one or more pages of the multi-page document as the user progresses through the multi-page document;

deleting cached data associated with one or more successive pages when the user goes back to an earlier page of the multi-page document;

receiving a request from the user to view the multi-page document as a full-page document;

comparing text of the cached one or more pages to text of the full-page document to determine a first appearance of non-duplicative text in the full-page document;

returning all pages of the full-page document together; and presenting the full-page document to the user with the screen of the small screen user device showing a page comprising the first appearance of non-duplicative text of the full-page document.

7. The method of claim 6, wherein the cached one or more pages are stored on a server.

8. The method of claim 6, further comprising:

storing the cached one or more pages on the small screen user device;

generating a request, the request comprising the one or more cached pages;

sending the request to a server;

generating a response, the response comprising a tag to identify the first appearance of non-duplicative text; and sending the response to the small screen user device.

9. The method of claim 6, wherein the presentation of the full-page document on the screen of the small screen user device comprises the first line of the first appearance of non-duplicative text.

10. The method of claim 6, wherein the presentation of the full-page document on the screen of the user device includes at least one line of leading text before the presentation of the first appearance of non-duplicative text.

11. The method of claim 10, wherein the number of lines comprising the leading text may be input by the user as a user preference.

12. A method for improving user navigation of a multi-page document on a small screen user device, the method comprising:

presenting one page of the multi-page document to a user on a screen of the small screen user device;

caching the most recently viewed one or more pages of the multi-page document viewed by the user as the user progresses through the multi-page document;

deleting cached data associated with one or more successive pages when the user goes back to an earlier page of the multi-page document;

receiving a request from the user to view the multi-page document as a full-page document;

comparing text of the cached most recently viewed pages to text of the full-page document to determine a first appearance of non-duplicative text in the full-page document;

returning all pages of the full-page document together; and presenting the full-page document to the user with the screen of the small screen user device showing a page containing the first appearance of non-duplicative text in the full-page document.

13. The method of claim 12, wherein the cached most recently viewed one or more pages are stored on a server.

14. The method of claim 12, further comprising:

storing the cached most recently viewed one or more pages on the small screen user device;

generating a request, the request comprising the most recently viewed one or more pages;

sending the request to a server;

generating a response, the response comprising a tag to identify the first appearance of non-duplicative text; and sending the response to the small screen user device.

15. The method of claim 12, wherein the screen displays a portion of the one page of the multi-page document.

16. The method of claim 15, wherein a portion of the one or more most recently viewed pages comprise the text lines at the bottom of the screen.

17. The method of claim 16, further comprising:

deleting cached pages subsequent to the most recently viewed pages when the user views an earlier portion of the multi-page document.

18. The method of claim 12, wherein the presentation of the full-page document on the screen of the small screen user device includes at least one line of leading text before the presentation of the first appearance of non-duplicative text.

19. The method of claim 18, wherein the number of lines comprising the leading text may be input by the user as a user preference.

\* \* \* \* \*